(12) United States Patent
Kanto et al.

(10) Patent No.: US 9,731,634 B2
(45) Date of Patent: Aug. 15, 2017

(54) SEAT CUSHION AIRBAG APPARATUS

(71) Applicant: TOYODA GOSEI CO., LTD., Kiyosu-shi, Aichi-ken (JP)

(72) Inventors: Takanori Kanto, Kiyosu (JP); Akihiro Nukaya, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 15/240,331

(22) Filed: Aug. 18, 2016

(65) Prior Publication Data
US 2017/0057385 A1 Mar. 2, 2017

(30) Foreign Application Priority Data

Aug. 28, 2015 (JP) ................. 2015-169694
Aug. 5, 2016 (JP) ................. 2016-154799

(51) Int. Cl.
| | | |
|---|---|---|
| B60R 21/207 | (2006.01) | |
| B60R 21/217 | (2011.01) | |
| B60R 21/231 | (2011.01) | |
| B60R 21/239 | (2006.01) | |
| B60N 2/427 | (2006.01) | |
| B60R 21/235 | (2006.01) | |

(52) U.S. Cl.
CPC ........ *B60N 2/42763* (2013.01); *B60R 21/207* (2013.01); *B60R 21/2171* (2013.01); *B60R 21/231* (2013.01); *B60R 21/235* (2013.01); *B60R 21/239* (2013.01); *B60R 2021/23107* (2013.01); *B60R 2021/23509* (2013.01)

(58) Field of Classification Search
CPC .............. B60N 2/42763; B60R 21/207; B60R 21/2171; B60R 21/231; B60R 2021/23107; B60R 21/217
See application file for complete search history.

(56) References Cited

U.S. PATENT DOCUMENTS 7,306,257 B2 * 12/2007 Yoshikawa ........... B60R 21/207
280/728.2
8,302,989 B2 * 11/2012 Takimoto ................ B60R 21/36
180/274

(Continued)

FOREIGN PATENT DOCUMENTS

| JP | 2005096626 A | * | 4/2005 |
|---|---|---|---|
| JP | 2007-118816 A | | 5/2007 |
| JP | 2009-132245 A | | 6/2009 |

*Primary Examiner* — Paul N Dickson
*Assistant Examiner* — Joselynn Y Sliteris
(74) *Attorney, Agent, or Firm* — Posz Law Group, PLC

(57) ABSTRACT

The outer shape of an airbag is formed by an airbag main body. The airbag has an insertion opening, which extends along the periphery of the airbag. The gas generator includes bolts. The lower part of the airbag main body is configured by a lower fabric portion, which has first insertion holes in the periphery. The bolts are inserted into the first insertion holes and fastened to the seat portion. A harness, which is connected to the gas generator, is drawn out of the airbag main body through the insertion opening. Among the first insertion holes, the one that is farthest from the harness is a first specified insertion hole. The lower fabric portion has a first slit, which extends from the inner periphery of the first specified insertion hole in a direction away from the adjacent general insertion hole.

8 Claims, 11 Drawing Sheets

(56) References Cited

U.S. PATENT DOCUMENTS

| | | | |
|---|---|---|---|
| 8,888,126 B2 * | 11/2014 | Nukaya | B60N 2/42718 280/730.1 |
| 2008/0088119 A1 * | 4/2008 | Murakami | B60R 21/207 280/730.1 |
| 2009/0045606 A1 | 2/2009 | Yoshikawa et al. | |
| 2017/0057386 A1 * | 3/2017 | Kanto | B60N 2/42763 |

* cited by examiner

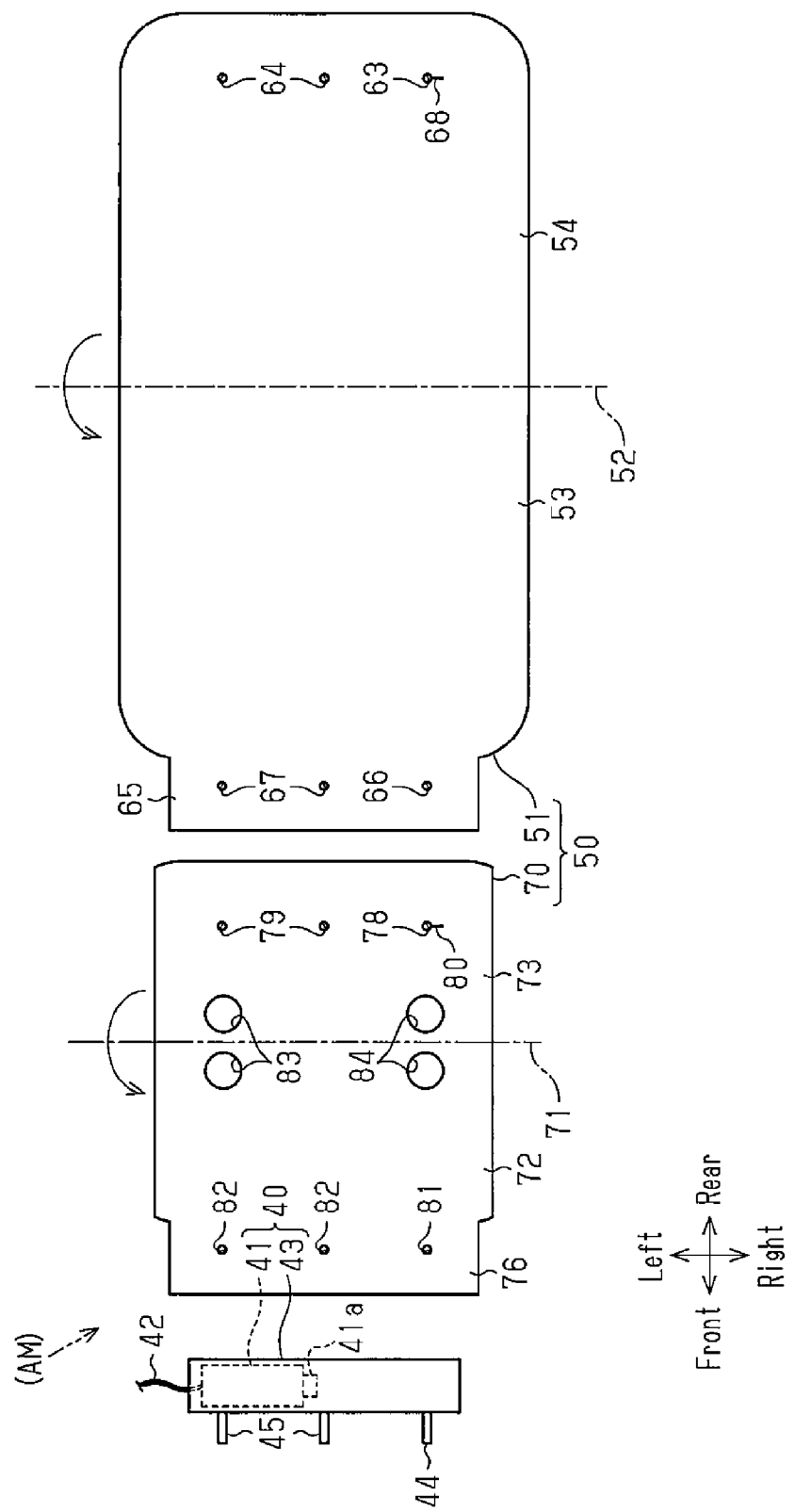

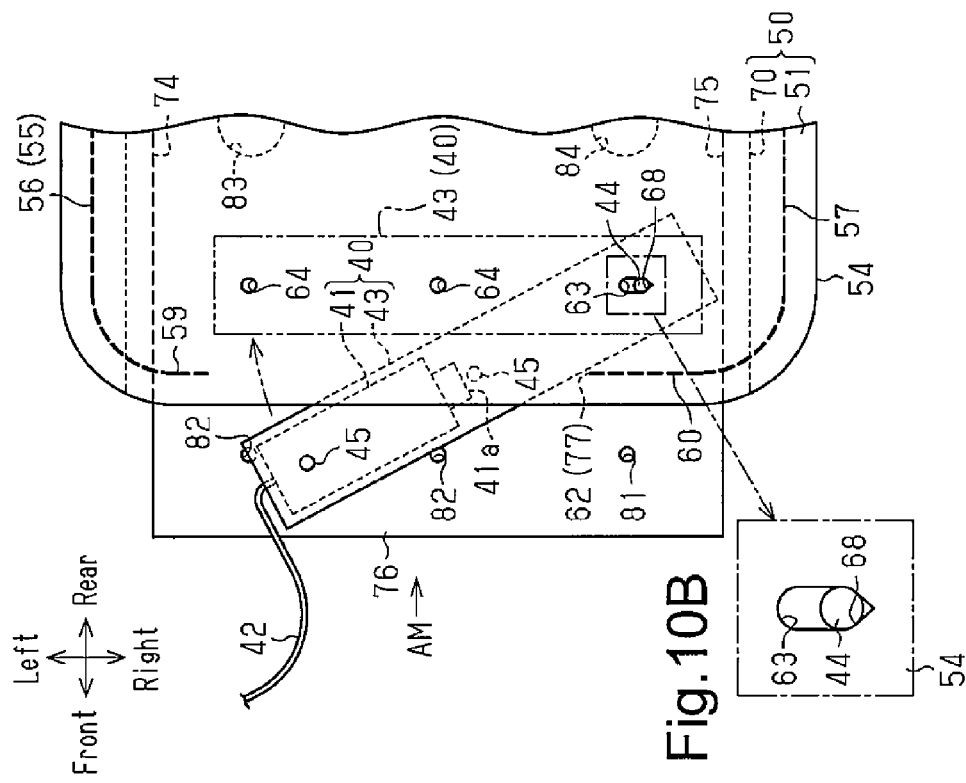

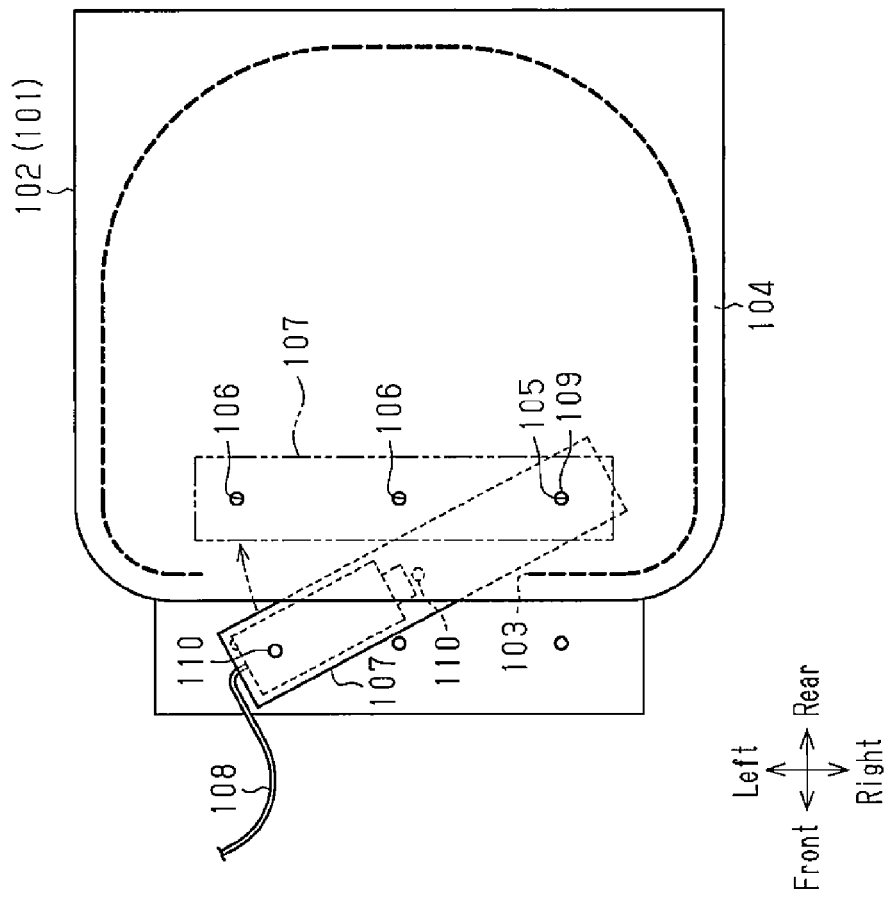
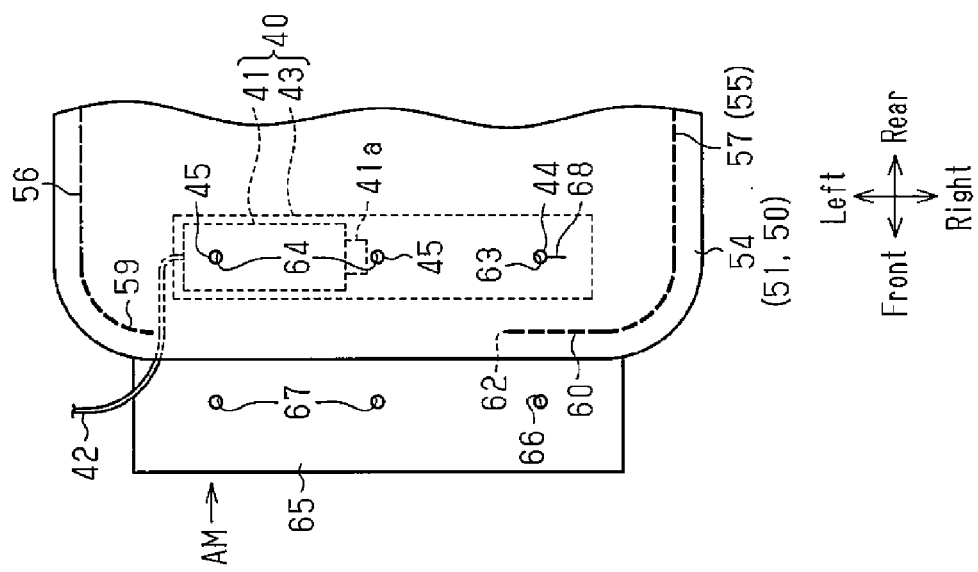
Fig.15(Prior Art)

SEAT CUSHION AIRBAG APPARATUS

BACKGROUND OF THE INVENTION

The present invention relates to a seat cushion airbag apparatus that is configured to inflate an airbag installed in a seat portion of a vehicle seat, such as an automobile seat, with inflation gas, to raise the seating face, thereby restraining an object-to-be-restrained, such as an occupant, on the seat portion, from moving forward.

When an impact due to a frontal collision is applied to an automobile from front, the lumbar region of the occupant restrained to an automobile seat by the seat belt device may be disengaged from the lap belt portion and move forward. A number of countermeasures against this phenomenon have been implemented or proposed.

For example, Japanese Laid-Open Patent Publication No. 2009-132245 discloses a seat cushion airbag apparatus that is employed in an automobile seat having a cushion portion. The cushion portion is supported from below by a support portion of the seat frame.

As shown in FIG. 15, the seat cushion airbag apparatus includes at least an airbag 101 and an elongated gas generator 107. The airbag 101 is arranged between the support portion and the cushion portion. The outer shape of the airbag 101 is formed by an airbag main body 102. The airbag main body 102 has an insertion opening 103 at the front end. The insertion opening 103 extends in the width direction of the automobile seat (automobile width direction) and is shorter than the gas generator 107 in the width direction. The airbag main body 102 also includes a lower fabric portion 104, which configures the lower part. The lower fabric portion 104 has several insertion holes at the front end. These insertion holes are located at positions spaced apart in the width direction of the automobile seat and include a specified insertion hole 105, which is farthest from a harness 108, and remaining general insertion holes 106. The harness 108 will be discussed below.

The gas generator 107 is arranged at the front end in the airbag main body 102 and in a position to extend in the automobile width direction. The harness 108 is connected to a first end of the gas generator 107. The gas generator 107 has several bolts extending downward from positions spaced apart in the longitudinal direction. The bolts include a specified bolt 109, which is farthest from the harness 108, and remaining general bolts 110.

The specified bolt 109 is inserted into the specified insertion hole 105 and is fastened to the support portion of the seat frame. Each general bolt 110 is inserted into the corresponding general insertion hole 106 and fastened to the support portion. The harness 108 is drawn out of the airbag main body 102 through the insertion opening 103.

The seat cushion airbag apparatus is configured as described above.

Thus, when an impact is applied to the automobile from the front with respect to the automobile seat, for example, due to a frontal collision, the occupant acts to move forward due to inertia. The restraining action of the seat belt device holds the occupant on the seat portion. However, depending on the posture of the occupant, the lumbar region may act to move forward.

The gas generator 107 of the seat cushion airbag apparatus discharges inflation gas in response to the frontal impact to inflate the airbag main body 102. Accordingly, the cushion portion is pushed upward so that the seat surface of the seat portion bulges. In the thighs of the occupant, who is restrained onto the automobile seat by the seat belt device, regions close to the backs of the knees are pushed upward, so that the lumbar region is pushed against the lap belt portion. This improves the performance of the lap belt portion to restrain the occupant, thereby restricting the forward movement of the lumbar region.

In the above described seat cushion airbag apparatus, when the gas generator 107 is installed in the airbag main body 102, a second end of the gas generator 107, to which the harness 108 is not connected, is first inserted through the insertion opening 103 into the front end of the airbag main body 102. As shown in FIG. 15, the specified bolt 109 is inserted into the specified through hole 105.

Subsequently, the gas generator 107 is rotated toward the insertion opening 103 about the specified bolt 109. The rotation causes the gas generator 107 to enter the front end in the airbag main body 102 through the insertion opening 103. The harness 108, which is connected to the gas generator 107, is drawn out of the airbag main body 102 through the insertion opening 103.

When the general bolts 110 are aligned with the general insertion holes 106 as indicated by the long dashed double-short dashed line in FIG. 15, the general bolts 110 are inserted into the general insertion holes 106. Thus, the gas generator 107 is secured to the airbag main body 102 with its position determined with respect to the airbag main body 102.

After being respectively inserted into the specified insertion hole 105 and general insertion holes 106, the specified bolt 109 and the general bolts 110 protrude out from the airbag main body 102. The specified bolt 109 and the general bolts 110 are fastened to the seat portion at the protruding portions.

However, in the above described conventional seat cushion airbag apparatus, if a long gas generator 107 is used, the gas generator 107 may catch on the end of the insertion opening 103 closer to the harness 108 during rotation of the gas generator 107 about the specified bolt 109, which is inserted into the specified hole 105. In this case, it is difficult to insert the gas generator 107 into the front end in the airbag main body 102 through the insertion opening 103.

SUMMARY OF THE INVENTION

Accordingly, it is an objective of the present invention to provide a seat cushion airbag apparatus that allows a gas generator to be easily installed in an airbag, thereby facilitating the assembly of the gas generator.

To achieve the foregoing objective and in accordance with one aspect of the present invention, a seat cushion airbag apparatus is provided that at least includes an air bag and an elongated gas generator. The airbag is arranged in a seat portion of a vehicle seat. An outer shape of the airbag is formed by an airbag main body. The gas generator is arranged in a periphery in the airbag main body. The gas generator has an end to which a harness is connected. The seat cushion airbag apparatus is configured to inflate the airbag main body with inflation gas supplied by the gas generator to raise a seating face of the seat portion, thereby restraining an object-to-be-restrained on the seat portion from moving forward. The airbag includes an insertion opening, which extends along a periphery of the airbag and has a dimension shorter than a length of the gas generator. The harness is drawn out of the airbag main body through the insertion opening. The airbag main body includes a lower fabric portion, which configures a lower part of the airbag main body. The lower fabric portion includes a plurality of first insertion holes and a first slit. The first insertion holes are located in a periphery of the lower fabric portion. Among the first insertion holes, one that is farthest from the harness is a first specified insertion hole. The first slit extends from an inner periphery of the first specified insertion hole in a direction away from the adjacent first insertion hole. The gas generator includes a plurality of bolts, which extends downward from a plurality of positions spaced apart in a longitudinal direction of the gas generator. The first insertion holes of the lower fabric portion are arranged to correspond to the bolts. The bolts are configured such that each bolt is inserted into the corresponding one of the first insertion holes of the lower fabric portion and fastened to the seat portion.

BRIEF DESCRIPTION OF THE DRAWINGS

FIG. 8 is a side view of the gas generator and spread states of the fabric portions used in the airbag main body and the inner bag.

FIG. 9 is a partial bottom view illustrating a state in which the gas generator is being installed in the front end in the airbag according to the embodiment.

FIG. 10A is a partial bottom view illustrating a state in which the gas generator is being installed in the front end in the airbag according to the embodiment.

FIG. 10B is an enlarged bottom view showing a part of FIG. 10A.

FIG. 14 is a partial bottom view of a part corresponding to FIG. 5A, illustrating a seat cushion airbag apparatus of a modification in which the airbag is configured only by an airbag main body without an inner bag.

FIG. 15 is a bottom view corresponding to FIG. 10A, illustrating a conventional seat cushion airbag apparatus, in which the gas generator is being installed in the front end of the airbag.

DETAILED DESCRIPTION OF THE PREFERRED EMBODIMENTS

An automobile seat cushion airbag apparatus (hereinafter, simply referred to as an airbag apparatus) according to one embodiment will now be described with reference to FIGS. 1 to 13.

Figure 3:
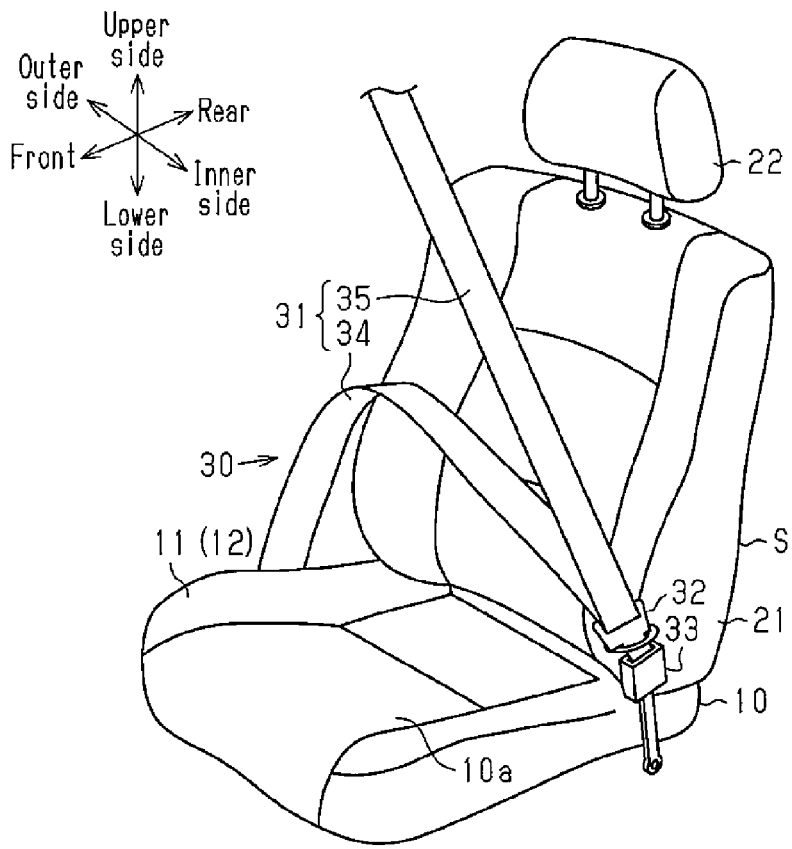
FIG. 3 is a perspective view illustrating the automobile seat and the seat belt device shown in FIG. 1.

In the following description, the advancing direction of the automobile is defined as a forward direction. The backward, upward, downward, leftward, and rightward directions are defined with reference to the forward direction. In FIG. 3, the "inner side" indicates the direction toward the center of the automobile, and the "outer side" indicates the outward direction with respect to the automobile. The inner side of the automobile corresponds to the side toward the center in the width direction of the automobile. The outer side of the automobile corresponds to the side away from the center. It is now assumed that an occupant having a size equivalent to a crash test dummy is seated on the automobile seat.

Figure 1:
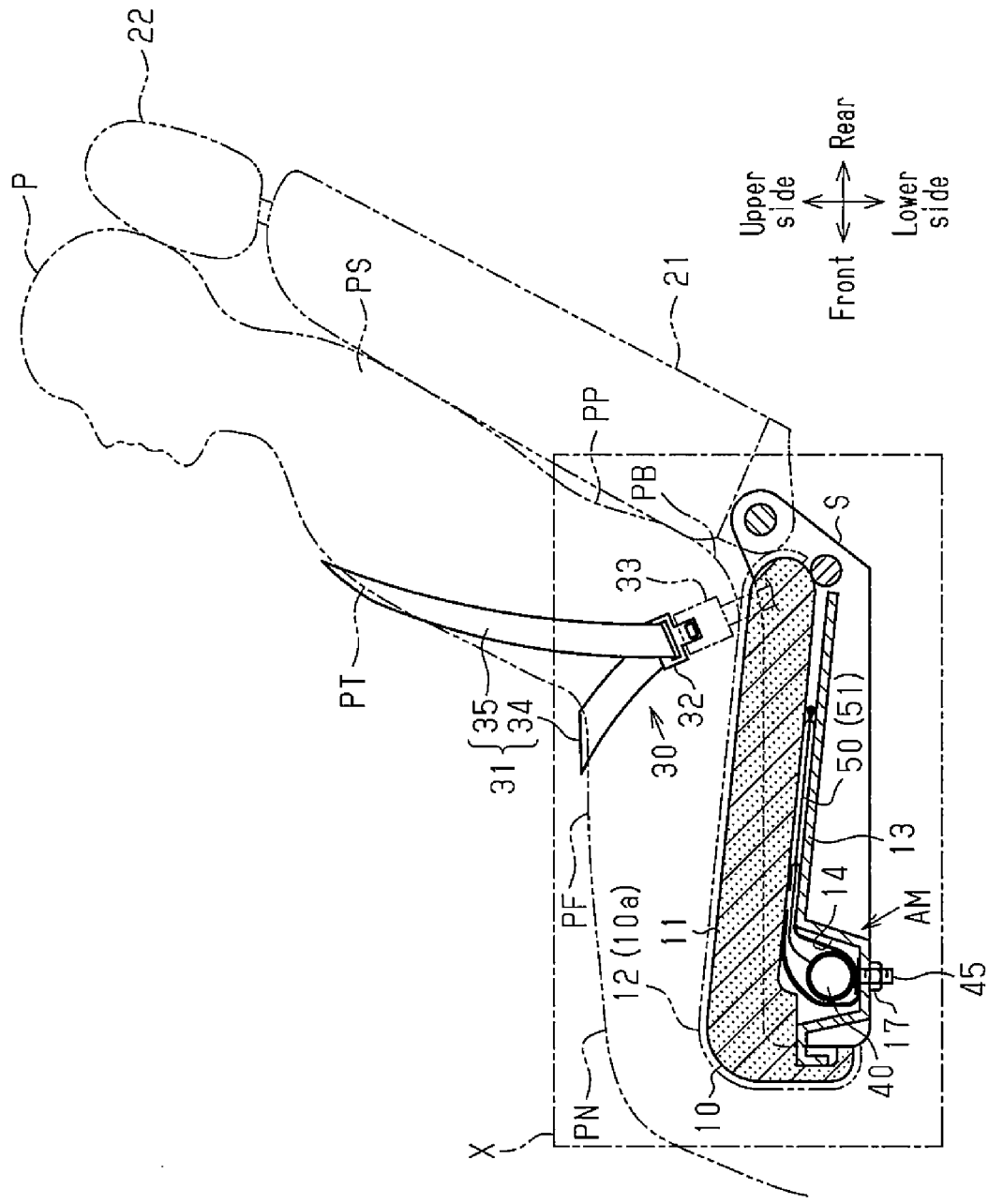
FIG. 1 is a cross-sectional side view of an automobile seat cushion airbag apparatus according to one embodiment, illustrating the apparatus installed in an automobile seat, together with an occupant and a seat belt device.

As shown in FIGS. 1 and 3, an automobile seat S, which is a vehicle seat, is arranged in an automobile, which is a vehicle. The automobile seat S has a seat portion (seat cushion) 10, a seat back 21, which can be tilted and is arranged to be upright at the rear end of the seat portion 10, and a headrest 22 arranged on the top of the seat back 21. The automobile seat S is arranged in the automobile such that the seat back 21 faces forward. The front-rear direction of the thus arranged automobile seat S agrees with the front-rear direction of the automobile, and the width direction of the thus arranged automobile seat S agrees with the width direction of the automobile (automobile width direction).

The seat portion 10 is a part on which an occupant P, or an object to be restrained by the airbag device (object-to-be restrained), is seated. The seat portion 10 includes a cushion portion 11 and a steel seat pan 13, which is a support portion supporting the cushion portion 11 from below. The cushion portion 11 is covered with a cover 12, which is made of fabric or leather. An accommodation recess 14 is formed in a front portion of the seat pan 13 to accommodate a part (front portion) of an airbag module AM, which will be discussed below. The accommodation recess 14 has an open upper end and extends in the automobile width direction.

The automobile is equipped with a seat belt device 30 for restraining an occupant P seated on the automobile seat S.

The seat belt device 30 has belt-like webbing 31 for restraining the occupant P, a tongue 32 attached to the webbing 31 to be movable along the length of the webbing 31, and a buckle 33 provided on the inner side of the seat portion 10. The tongue 32 is detachably engaged with the buckle 33. A first end of the webbing 31 is fixed to the outer side of the seat portion 10, and a second end of the webbing 31 is wound by a seat belt retractor (not shown) on the outer side. In the seat belt device 30, the tongue 32 is slid along the webbing 31 to change the lengths of a lap belt portion 34 and a shoulder belt portion 35.

The lap belt portion 34 is a portion of the webbing 31 between the tongue 32 and the fixed end and traverses the lumbar region PP of the seated occupant P, while extending from one side of the lumbar region PP to the other side via the front side of the lumbar region PP. The shoulder belt portion 35 corresponds to a portion of the webbing 31 between the tongue 32 and the seat belt retractor and traverses from the shoulder region PS of the seated occupant P to a side of the lumbar region PP via the thorax PT.

The vehicle is equipped with an airbag apparatus that suppresses the submarine phenomenon. The submarine phenomenon refers to a phenomenon in which, when an impact from the front is applied to the automobile, the lumbar region PP of the occupant P restrained to the automobile seat S by the seat belt device 30 may be disengaged from the lap belt portion 34 and move forward.

Figure 2:
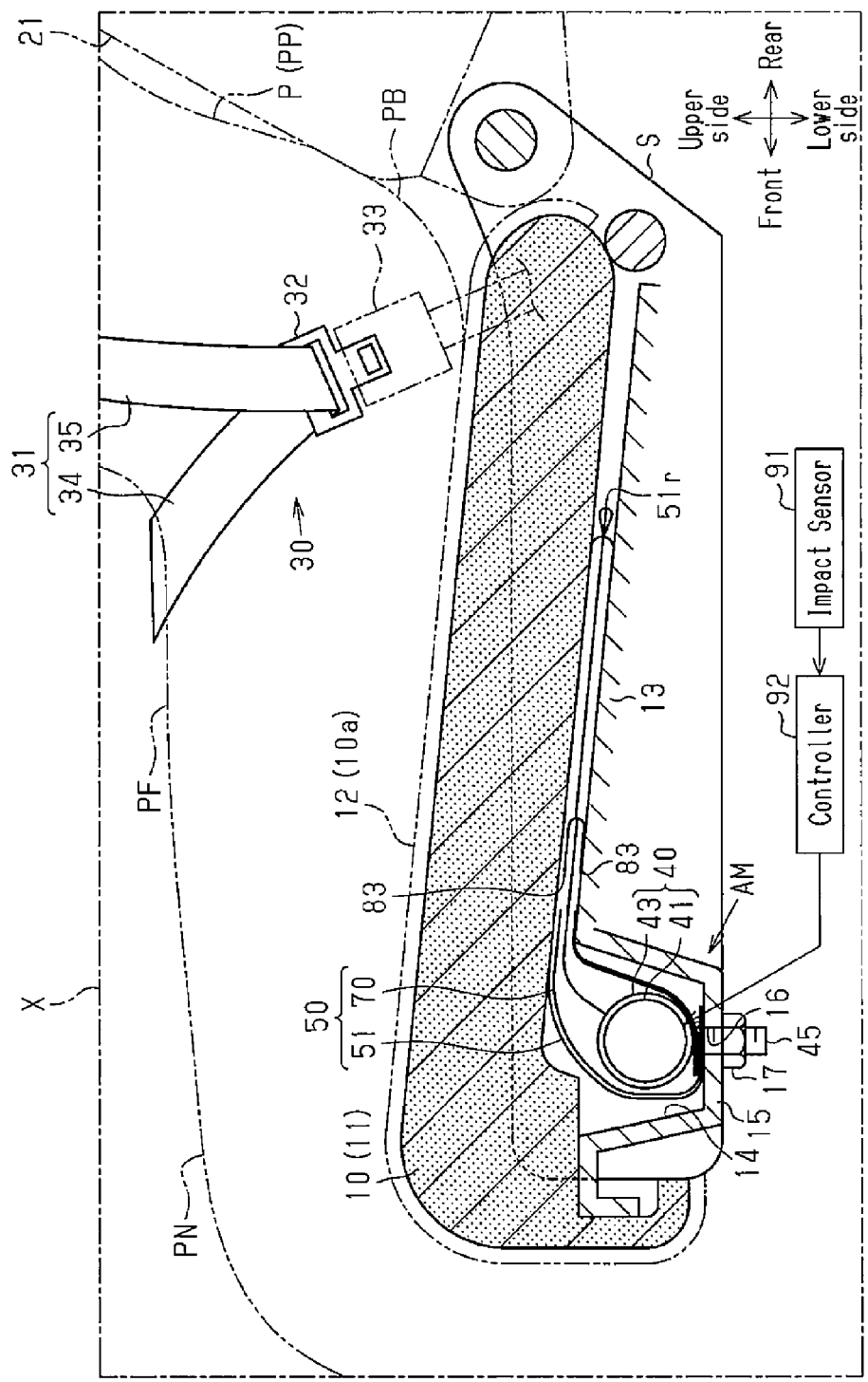
FIG. 2 is an enlarged partial cross-sectional side view illustrating section X in FIG. 1.

FIG. 2 schematically illustrates the structure of the airbag apparatus. The details are omitted in FIG. 2. As shown in FIG. 2, the airbag apparatus includes the airbag module AM, an impact sensor 91, and a controller 92.

The airbag module AM includes a gas generator 40 and an airbag 50. The airbag 50 includes an airbag main body 51 and an inner bag 70. The components configuring the airbag module AM will now be described.

<Configuration of Gas Generator 40>

Figure 7:
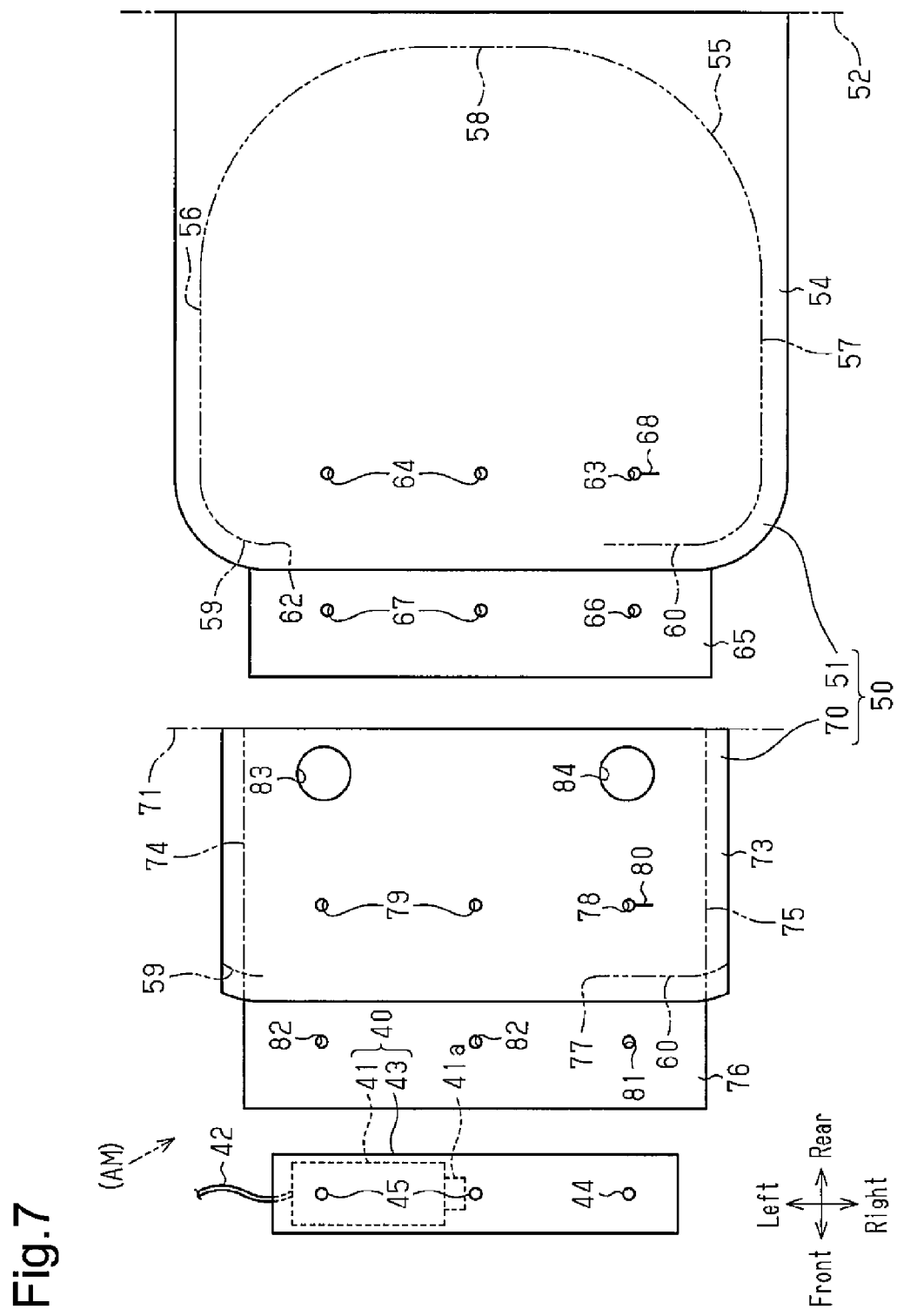
FIG. 7 is a bottom view of the components (the airbag main body, the inner bag, and the gas generator) of the airbag module shown in FIG. 5A.

The gas generator 40 is configured to supply inflation gas G to the airbag 50 and, as shown in FIGS. 7 and 8, includes an inflator 41 and a retainer 43, which surrounds the inflator 41. In the present embodiment, a pyrotechnic type inflator is employed as the inflator 41. The inflator 41 has an elongated shape (substantially columnar shape) extending in the automobile width direction and accommodates a gas generating agent (not shown), which generates inflation gas G. A gas outlet 41a, which discharges inflation gas G, is provided on a first end of the inflator 41 in the automobile width direction. A harness 42 for delivering control signals to the inflator 41 is connected to a second end of the inflator 41 in the automobile width direction.

As the inflator 41, different types from the pyrotechnic type may be employed. Such types include a stored gas type, which discharges inflation gas by breaking, with a low explosive, a partition wall of a high-pressure gas cylinder filled with high-pressure gas, and a hybrid type, which is combination of the pyrotechnic type and the stored gas type.

Most of the retainer 43 is formed as a thin and elongated cylinder by bending, for example, a metal plate. Both ends of the retainer 43 are open. Bolts are fixed to the lower surface of the retainer 43. The bolts are arranged at positions spaced apart in the automobile width direction. In the present embodiment, three bolts are fixed to three positions on the lower surface of the retainer 43. The bolt that is farthest from the harness 42 is distinguished from the other bolts by being referred to as a specified bolt 44. The remaining two bolts will be referred to as general bolts 45.

The inflator 41 may be integrated with the retainer 43.

<Configuration of Airbag Main Body 51>

The airbag main body 51 configures the outer shape of the airbag 50 and functions to raise a seat surface 10a of the seat portion 10. The airbag main body 51 is formed by folding, in half, a single fabric piece or a stacked set of fabric pieces, which is rectangular and elongated in the front-rear direction, along a folding line 52 set at the center portion to be overlapped vertically, and joining the overlapped parts into a bag shape. Such fabric pieces are also referred to as base fabric or fabric panels. In this description, to distinguish the two overlapped parts of the airbag main body 51, the part located on the upper side is referred to as an upper fabric portion 53, and the part located on the lower side is referred to as a lower fabric portion 54.

The upper and lower fabric portions 53, 54 are preferably formed of a material having high strength and flexibility. The material may be, for example, woven cloth formed of polyester threads or polyamide threads.

The upper and lower fabric portions 53, 54 are joined to each other at a peripheral joint portion 55 provided at the peripheries of the fabric portions 53, 54. That is, the periphery of the lower fabric portion 54 and the periphery of the upper fabric portion 53 are joined at the peripheral joint portion 55. In the present embodiment, the peripheral joint portion 55 is formed by sewing part of the peripheries of the upper and lower fabric portions 53, 54 except for the front end. Third and fourth side edge joint portions 74, 75, which will be discussed below, have a similar structure.

The peripheral joint portion 55 is configured by first and second side edge joint portions 56, 57, a rear joint portion 58, and first and second front end joint portions 59, 60. The first and second side edge joint portions 56, 57 are spaced apart from each other in the automobile width direction and extend in the front-rear direction. The rear joint portion 58 has an arcuate shape bulging rearward. The ends of the rear joint portion 58 are connected to the rear ends of the first and second side edge joint portions 56, 57. The rear joint portion 58 may have a shape other than the arcuate shape. For example, the rear joint portion 58 may have a linear shape.

The first front end joint portion 59 extends from the front end of the first side edge joint portion 56 toward the front end of the second side edge joint portion 57 on the opposite side. The second front end joint portion 60 extends from the front end of the second side edge joint portion 57 toward the front end of the first side edge joint portion 56 on the opposite side. As shown in FIG. 5A, the second front end joint portion 60 is closer to the gas outlet 41a than the harness 42. The extending length of the second front end joint portion 60 from the second side edge joint portion 57 is defined as L1. The first front end joint portion 59 is closer to the harness 42 than the gas outlet 41a. The extending length of the first front end joint portion 59 from the first side edge joint portion 56 is defined as L2. In the present embodiment, the extending lengths L1, L2 are set to meet the expression L1>L2.

Two types of lines represent sewing portions in FIGS. 5A, 6, and 9 to 12. The same applies to FIG. 14, which illustrates an airbag apparatus of a modification, and FIG. 15, which illustrates the conventional airbag apparatus. The first type of line includes thick line segments of a certain length arranged intermittently and represents sewing threads as viewed from above or below (refer to the peripheral joint portion 55 in FIG. 5A). The second type of line includes thin line segments of a certain length (longer than those in a typical broken line) arranged intermittently and represents sewing threads that are located, for example, between the upper fabric portion 53 and the lower fabric portion 54 and cannot be seen directly (refer to the third and fourth side edge joint portions 74, 75 in FIG. 5A).

In the present embodiment, the airbag main body 51 is formed by folding a single fabric piece in half. Thus, a joint part of the peripheral joint portion 55 in the vicinity of the folding line 52 (the rear joint portion 58) may be omitted.

In the present embodiment, the fabric piece is folded in half such that the folding line 52 is located at the rear end of the airbag main body 51. However, the fabric piece may be folded in half such that the folding line 52 is located at another end. The airbag main body 51 may also be formed of two or more fabric pieces divided along the folding line 52. In this case, the airbag main body 51 is formed by vertically overlapping two or more fabric pieces, and joining the fabric pieces into a bag shape. The greater the number of the fabric pieces, the greater the strength of the airbag main body 51 becomes. Such a modification may be applied to the inner bag 70.

The peripheral joint portion 55 may be formed by method other than sewing using sewing threads, for example, by using an adhesive or welding. The third and fourth side edge joint portions 74, 75, which will be discussed below, may be modified in the same manner.

As shown in FIGS. 5A and 7, in the airbag main body 51, in which the upper fabric portion 53 and the lower fabric portion 54 are joined to each other at the peripheral joint portion 55, the part surrounded by the peripheral joint portion 55 configures an inflation portion, which is inflated by the inflation gas G.

Further, the part in the front end of the airbag main body 51 that is not joined by the peripheral joint portion 55, in other words, a part between the lower fabric portion 54 and the upper fabric portion 53 and between the first and second front end joint portions 59, 60 configures a first insertion port 62. The first insertion port 62 forms a part of the insertion opening at the front end of the airbag 50. The dimension of the first insertion port 62 in the automobile width direction is set to be shorter than the length of the gas generator 40 (except for the harness 42).

The lower fabric portion 54 has three first insertion holes at positions that are separated rearward from the first insertion port 62, that is, at the front end of the lower fabric portion 54. Specifically, the lower fabric portion 54 has a first specified insertion hole 63 for receiving the specified bolt 44 of the gas generator 40 and two first general insertion holes 64 for receiving the two general bolts 45. These first insertion holes, that is, the first specified insertion hole 63 and the first general insertion holes 64 are spaced apart from each other in the automobile width direction. Among the three first insertion holes, the first specified insertion hole 63 is closest to the second front end joint portion 60, which has the extending length L1, and farthest from the first front end joint portion 59, which has the extending length L2.

As shown in FIGS. 5A and 5B, the lower fabric portion 54 has a first slit 68, which extends from the inner periphery of the first specified insertion hole 63 in a direction away from the adjacent first general insertion hole 64. In the present embodiment, the first slit 68 extends from the first specified insertion hole 63 in a direction that is opposite to the direction toward the adjacent first general insertion hole 64.

As shown in FIGS. 7 and 8, a forward protruding first flap portion 65 is integrally formed with the front end of the upper fabric portion 53. The part at which the first flap portion 65 is provided is located forward of the first insertion port 62. The first flap portion 65 is configured to cover the front end of the airbag main body 51 to block the first insertion port 62 and the first slit 68.

The first flap portion 65 has three first engagement holes. Specifically, the first flap portion 65 has a first specified engagement hole 66 for engaging the first flap portion 65 with the single specified bolt 44 and two first general engagement holes 67 for engaging the first flap portion 65 with the two general bolts 45. These first engagement holes, that is, the first specified engagement hole 66 and the first general engagement holes 67 are spaced apart from each other in the automobile width direction.

The first specified engagement hole 66, the first general engagement holes 67, the specified bolt 44, and the general bolts 45 configure a first holding portion, which holds the first flap portion 65 such that the first flap portion 65 covers the front end of the airbag main body 51 to block the first insertion port 62 and the first slit 68.

In the inflated state, the airbag main body 51 is structured to include a rear inflation portion 50r, which is inflated below the upper thighs PF of the occupant P, and a front inflation portion 50f, which is inflated below the lower thighs PN of the occupant P and to a position higher than the rear inflation portion 50r.

<Configuration of Inner Bag 70>

As shown in FIGS. 7 and 8, the inner bag 70 configures the airbag 50 together with the airbag main body 51. The inner bag 70 is arranged in the airbag main body 51 (the front inflation portion 50f) to encompass the gas generator 40. The inner bag 70 is formed by folding, in half, a single fabric piece or a stacked set of fabric pieces along a folding line 71 set at the center portion to be overlapped vertically, and joining the overlapped parts into a bag shape. The fabric piece is made of the same material as that of the airbag main body 51 and has a rectangular shape elongated in the front-rear direction. In this description, to distinguish the two overlapped parts of the inner bag 70, the part located on the upper side is referred to as an upper inner fabric portion 72, and the part located on the lower side is referred to as a lower inner fabric portion 73.

The upper inner fabric portion 72 and the lower inner fabric portion 73 are joined at the third and fourth side edge joint portions 74, 75. The third and fourth side edge joint portions 74, 75 extend in the front-rear direction along the side edges in the automobile width direction of the upper inner fabric portion 72 and the lower inner fabric portion 73.

The inner bag 70, which is formed by joining the upper inner fabric portion 72 and the lower inner fabric portion 73 at the third and fourth side edge joint portions 74, 75, has an inflation portion that is surrounded by the third and fourth side edge joint portions 74, 75 and the folding line 71. The inflation portion is configured to be inflated by the inflation gas G.

In the present embodiment, the inner bag 70 is formed by folding a single fabric piece in half. However, in addition to the third and fourth side edge joint portions 74, 75, an additional joint portion may be provided in the vicinity and along the folding line 71, and the upper inner fabric portion 72 and the lower inner fabric portion 73 may be joined at the additional joint portion.

A second flap portion 76, which protrudes forward, is integrally formed with the front end of the upper inner fabric portion 72. The part at which the second flap portion 76 is provided is located forward of a second insertion port 77, which will be discussed below. The second flap portion 76 has substantially the same shape and size as those of the first flap portion 65. The second flap portion 76 is configured to cover the front end of the airbag main body 51 to block the second insertion port 77 and the second slit 80.

As shown in FIGS. 5A and 7, the inner bag 70 is arranged in the front half of the airbag main body 51 with the second flap portion 76 placed over the first flap portion 65 of the airbag main body 51. The upper inner fabric portion 72 and the lower inner fabric portion 73 are sewn integrally together with the upper fabric portion 53 and the lower fabric portion 54 at the first and second front end joint portions 59, 60 of the peripheral joint portion 55. The inner bag 70 is thus attached to the airbag main body 51.

The part between the upper inner fabric portion 72 and the lower inner fabric portion 73 and between the first and second front end joint portions 59, 60 form the second insertion port 77. The second insertion port 77 is located in and surrounded by the first insertion port 62 of the airbag main body 51. The second insertion port 77 and the first insertion port 62 form an insertion opening at the front end of the airbag 50.

The insertion opening that is formed by the first insertion port 62 and the second insertion port 77 is used to insert the gas generator 40 into the airbag 50 and to draw out the harness 42 of the inserted gas generator 40 from the airbag 50.

The lower inner fabric portion 73 has three second insertion holes. Specifically, the lower inner fabric portion 73 has a second specified insertion hole 78 for receiving the specified bolt 44 and two second general insertion holes 79 for receiving the two general bolts 45. These second insertion holes, that is, the second specified insertion hole 78 and the second general insertion holes 79 are spaced apart from each other in the automobile width direction.

Among the three second insertion holes, the second specified insertion hole 78 is closest to the second front end joint portion 60, which has the extending length L1, and farthest from the first front end joint portion 59, which has the extending length L2. The second specified insertion hole 78 is farthest from the harness 42 among the three second insertion holes.

The lower inner fabric portion 73 has a second slit 80, which extends from the inner periphery of the second specified insertion hole 78 in a direction away from the adjacent second general insertion hole 79. In the present embodiment, the second slit 80 extends from the second specified insertion hole 78 in a direction that is opposite to the direction toward the adjacent second general insertion hole 79.

The second flap portion 76 has three second engagement holes. Specifically, the second flap portion 76 has a second specified engagement hole 81 for engaging the second flap portion 76 with the single specified bolt 44 and two second general engagement holes 82 for engaging the second flap portion 76 with the two general bolts 45. These second engagement holes, that is, the second specified engagement hole 81 and the second general engagement holes 82 are spaced apart from each other in the automobile width direction.

The second specified engagement hole 81, the second general engagement holes 82, the specified bolt 44, and the general bolts 45 configure a second holding portion, which holds the second flap portion 76 such that the second flap portion 76 covers the front end of the airbag main body 51 to block the second insertion port 77 and the second slit 80.

As shown in FIGS. 7 and 8, the inner bag 70, which is folded in half, has two gas venting portions in the rear part of each of the upper inner fabric portion 72 and the lower inner fabric portion 73. Specifically, the gas venting portions are circular gas vent holes 83, 84 that are spaced apart in the automobile width direction. The gas venting portions, or the gas vent holes 83, 84, have a function of connecting the inside and outside of the inner bag 70 to release the inflation gas G, which is discharged by the gas generator 40, to the airbag main body 51.

<Installation of Gas Generator 40 to Airbag 50>

As shown in FIGS. 5A, 5B, and 7, the above described gas generator 40 is inserted into the inner bag 70 in the airbag main body 51 through the second insertion port 77 and the first insertion port 62. The gas generator 40 is arranged in a position to extend in the automobile width direction. In the airbag main body 51, the front end, at which the gas generator 40 is arranged, is included in the periphery in the airbag main body 51. The single specified bolt 44 of the gas generator 40 is inserted into the second specified insertion hole 78 and the first specified insertion hole 63. The two general bolts 45 are inserted into the second general insertion holes 79 and the first general insertion holes 64.

Figure 4:
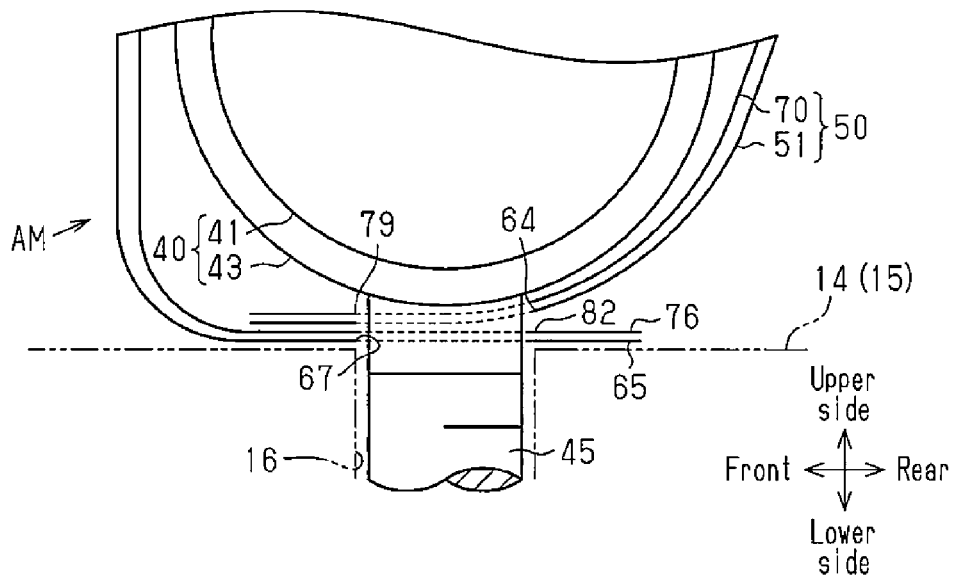
FIG. 4 is an enlarged cross-sectional side view partially showing a state in which the airbag is fastened to an accommodation recess of a seat pan.
Figure 5:
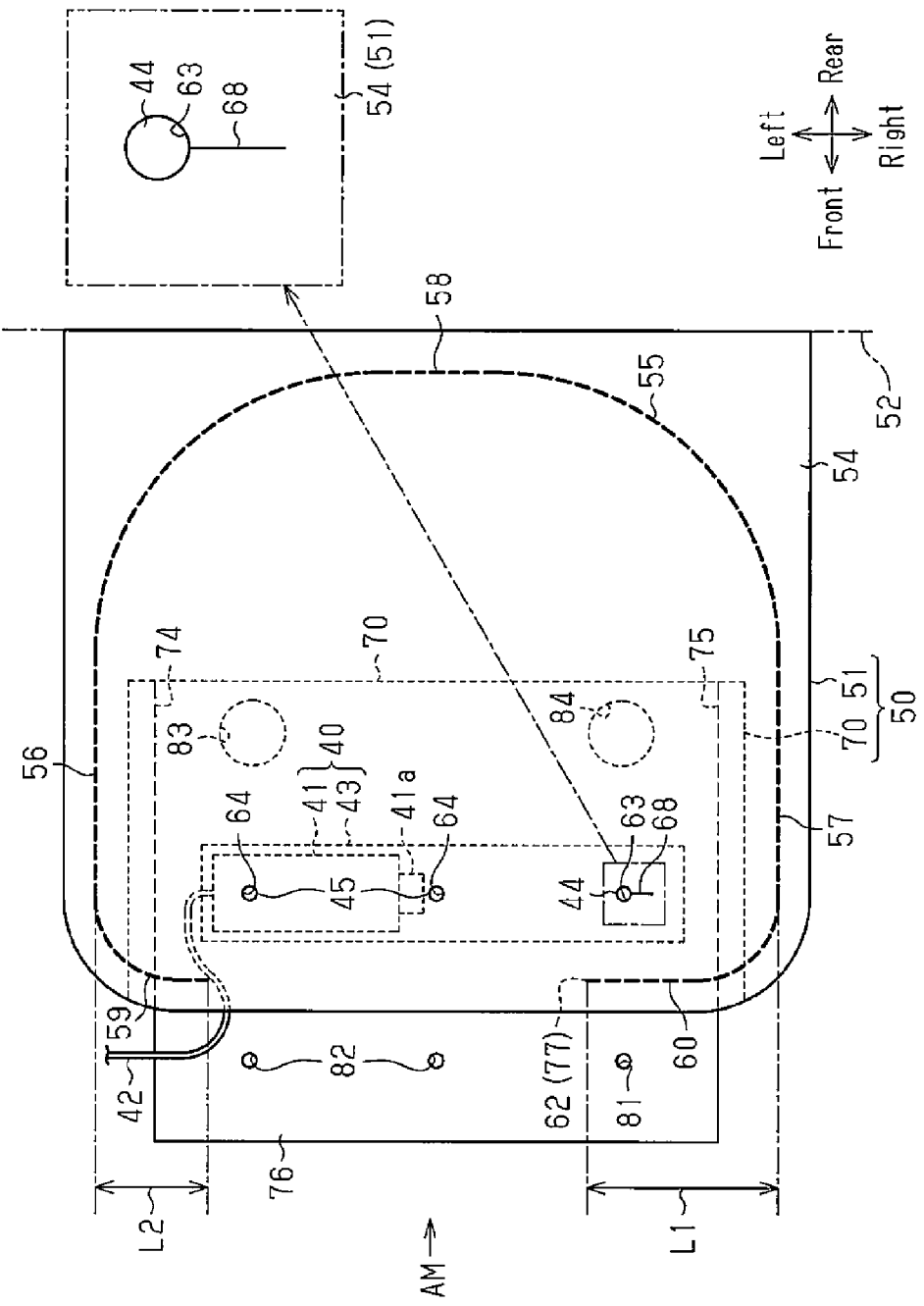
FIG. 5A is a bottom view of the airbag module according to the embodiment, illustrating a state before the first flap portion of the airbag main body and the second flap portion of the inner bag are folded back downward and rearward.
FIG. 5B is an enlarged bottom view showing a part of FIG. 5A.
Figure 6:
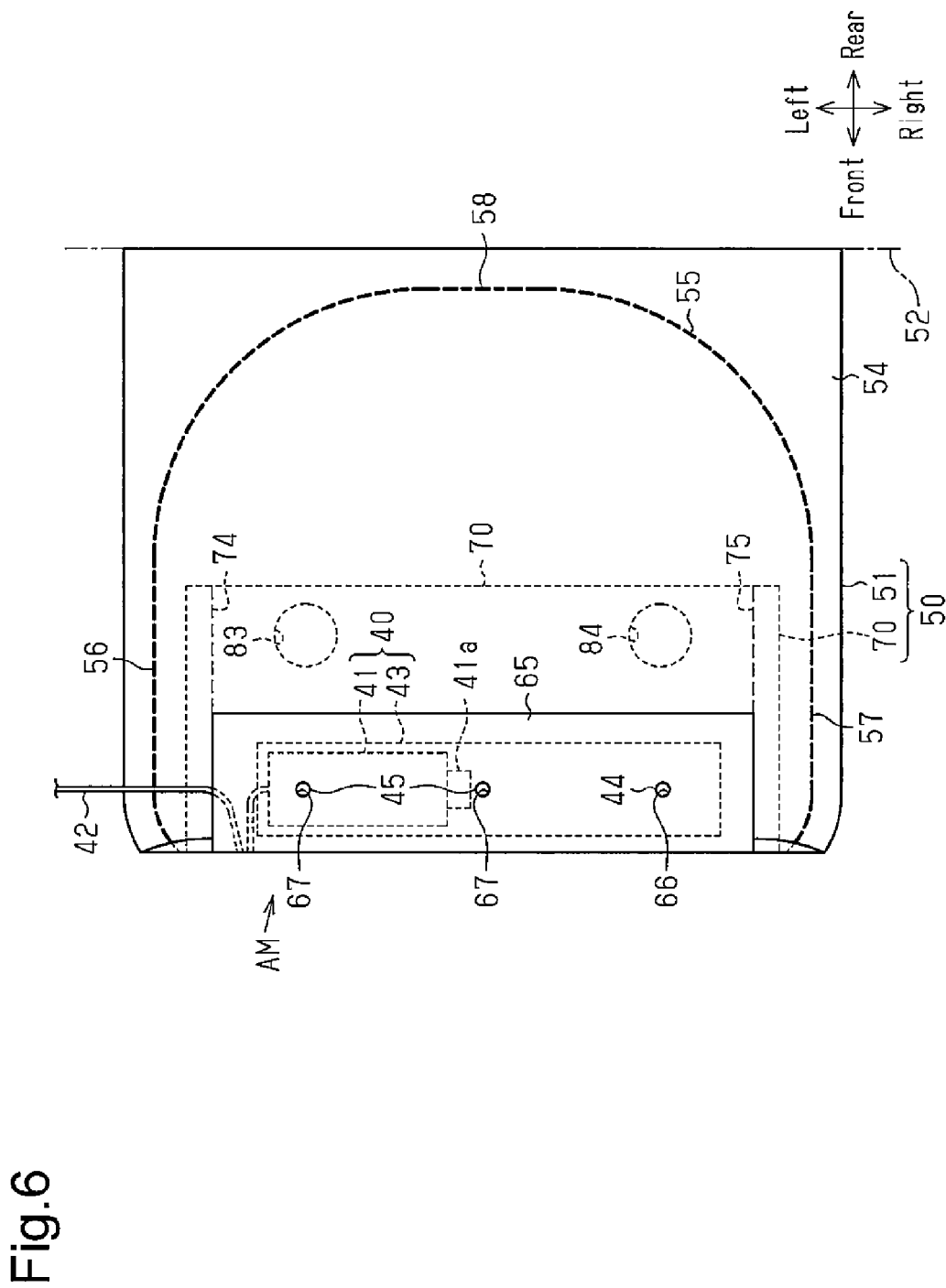
FIG. 6 is a bottom view of the airbag module, illustrating a state in which the first flap portion and the second flap portion of FIG. 5A are folded back downward and rearward to be secured to the front end of the airbag main body.

Further, as shown in FIGS. 4 and 6, the second flap portion 76 of the inner bag 70 and the first flap portion 65 of the airbag main body 51 are folded back downward and rearward and placed over the front end of the airbag main body 51. The specified bolt 44 is inserted into the second specified engagement hole 81 of the second flap portion 76 and the first specified engagement hole 66 of the first flap portion 65. Also, the general bolts 45 are inserted into the second general engagement holes 82 of the second flap portion 76 and the first general engagement holes 67 of the first flap portion 65. Accordingly, the second flap portion 76 and the first flap portion 65 are engaged with the specified bolt 44 and the general bolts 45. The engagement closes the first insertion port 62 and the first slit 68 of the airbag main body 51 as well as the second insertion port 77 and the second slit 80 of the inner bag 70. Also, the first flap portion 65 and the second flap portion 76 are held to cover the front end of the airbag main body 51.

At this time, the harness 42 has been drawn out of the airbag 50 through the second insertion port 77 and the first insertion port 62.

<Arrangement of Airbag Module AM>

As shown in FIGS. 2 and 4, the airbag module AM is arranged in the seat portion 10 with the first flap portion 65 and the second flap portion 76 located on the lower side. The front part of the airbag 50, in which the gas generator 40 is located, is accommodated in the accommodation recess 14 of the seat pan 13. Except for the front part, the airbag 50 is arranged between the cushion portion 11 and the seat pan 13, while being spread into a flat shape without being filled with the inflation gas G. A rear end 51r of the spread airbag main body 51 is located below the boundary between the upper thighs PF and the buttocks PB of the occupant P seated on the seat portion 10.

<Installation of Airbag Module AM>

The specified bolt 44 and the general bolts 45, which project downward from the airbag 50, are inserted into through-holes 16 formed in a bottom 15 of the accommodation recess 14. Nuts 17 are threaded from below to the specified bolt 44 and the general bolts 45, so that the gas generator 40 is fastened to the accommodation recess 14 together with the airbag 50. The fastening presses the front part of the airbag 50 against the bottom 15 of the accommodation recess 14, so that the insertion opening (the second insertion port 77 and the first insertion port 62) is closed. The specified bolt 44, the general bolts 45, and the nuts 17 have a function of attaching the airbag main body 51, the inner bag 70, and the gas generator 40 to the automobile (the accommodation recess 14 of the seat pan 13) and a function of holding the first flap portion 65 and the second flap portion 76 in the folded state.

As described above, the airbag apparatus includes the impact sensor 91 and the controller 92 shown in FIG. 2, in addition to the airbag module AM. The impact sensor 91 is, for example, an acceleration sensor and attached to the front bumper (not shown) of the automobile. The impact sensor 91 detects an impact applied to the front bumper from front, thereby detecting a frontal collision. The controller 92 controls operation of the inflator 41 based on a detection signal from the impact sensor 91.

The airbag apparatus of the present embodiment is configured as described above. Operation of the airbag apparatus will now be described.

First, installation of the gas generator 40 in the airbag 50 will be described.

When the gas generator 40 is installed in the airbag 50, the insertion opening (the second insertion port 77 and the first insertion port 62) is spread vertically. In this state, the gas generator 40 is tilted with respect to the insertion opening as shown in FIG. 9. The first end of the gas generator 40, to which the harness 42 is not connected, is inserted into the inner bag 70 in the airbag main body 51 through the insertion opening from the part close to the first front end joint portion 59 toward the second specified insertion hole 78 and the first specified insertion hole 63.

The specified bolt 44 is inserted into the second specified insertion hole 78 and the first specified insertion hole 63. As shown in FIGS. 10A and 10B, the specified bolt 44 is moved along the second slit 80 and the first slit 68. The moved specified bolt 44 spreads the second slit 80 and the first slit 68 in the front-rear direction.

Figure 11:
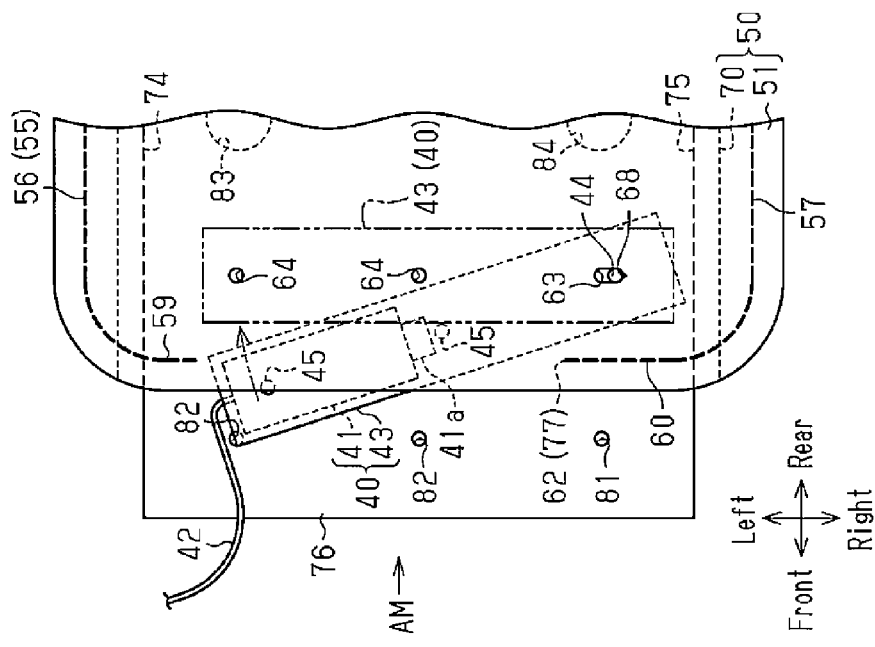
FIG. 11 is a partial bottom view illustrating a state in which the gas generator is being installed in the front end in the airbag according to the embodiment.

Subsequently, as indicated by the arrow of a long dashed double-short dashed line in FIG. 10A, the gas generator 40 is rotated about the specified bolt 44 toward the insertion opening. As the rotation progresses as shown in FIG. 11, the angle of the gas generator 40 with respect to the insertion opening decreases. At this time, as described above, the specified bolt 44 is located in the second slit 80 and the first slit 68 and away from the end of the insertion opening that is close to the harness 42 in the automobile width direction (the first front end joint portion 59). Thus, during the rotation, the gas generator 40 is unlikely to catch on the end of the insertion opening close to the harness 42 (the first front end joint portion 59). Through the rotation, the gas generator 40 is inserted into the front end of the inner bag 70 in the airbag main body 51 through the insertion opening.

The harness 42, which is connected to the gas generator 40, is drawn out of the inner bag 70 and the airbag main body 51 through a part in the vicinity of the end of the insertion opening that is close to the first front end joint portion 59.

Figure 12:
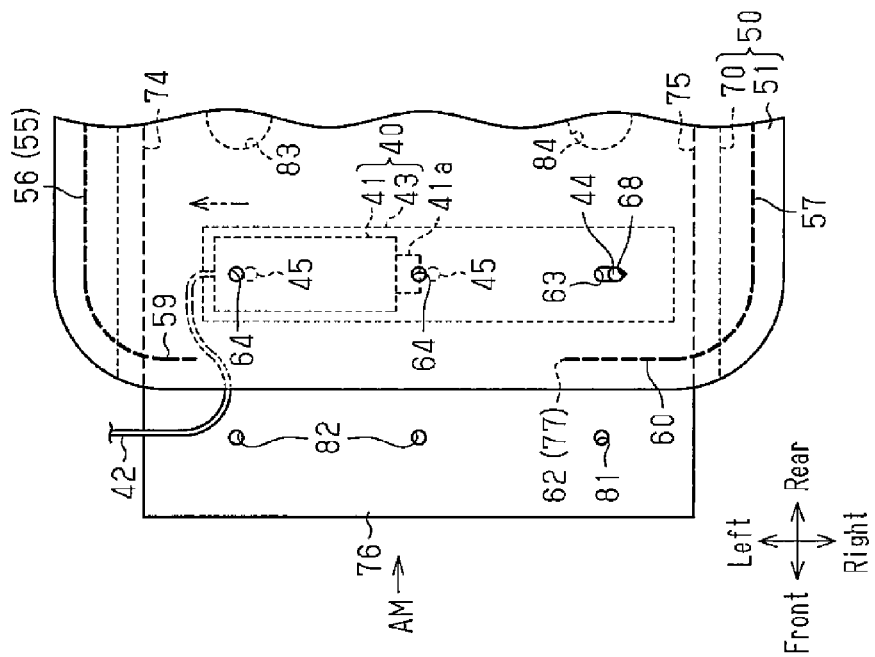
FIG. 12 is a partial bottom view illustrating a state in which the gas generator is being installed in the front end in the airbag according to the embodiment.

When put in a position to extend in the automobile width direction, the gas generator 40 is moved toward the first side edge joint portion 56 as indicated by the arrow of a long dashed double-short dashed line in FIG. 12. Accordingly, the specified bolt 44 is moved from inside the second slit 80 and first slit 68 into the second specified insertion hole 78 and first specified insertion hole 63. When the general bolts 45 are aligned with the second general insertion holes 79 and the first general insertion holes 64, the general bolts 45 are inserted into the second general insertion holes 79 and the first general insertion holes 64. This secures the gas generator 40 with its position determined with respect to the inner bag 70 and the airbag main body 51.

The first and second front end joint portions 59, 60 respectively extend from the front ends of the first and second side edge joint portions 56, 57 toward the second and first side edge joint portions 57, 56 on the opposite sides. The extending lengths L2, L1 of the first and second front end joint portions 59, 60 (refer to FIG. 5A) affect the airtightness of the airbag main body 51. The longer the extending lengths L2, L1, the smaller the dimensions of the second insertion port 77 and the first insertion port 62 become in the automobile width direction. Accordingly, the airtightness of the airbag main body 51 is improved. In contrast, if the extending length L2 of the first front end joint portion 59, which is close to the harness 42, is increased, the generator 40 and the harness 42 are more likely to catch on the end of the second insertion port 77, which configures at least part of the insertion opening, when the gas generator 40 is rotated about the specified bolt 44. To avoid this drawback, the second slit 80 and the first slit 68 must be extended. In contrast, even if the extending length L1 of the second front end joint portion 60, which is far from the harness 42, is increased, the second front end joint portion 60 is unlikely to hamper rotation of the gas generator 40.

In the present embodiment, the second slit 80 extends from the inner periphery of one of the second insertion holes, that is, from the inner periphery of the second specified insertion hole 78, which is farthest from the first front end joint portion 59 of the shorter length L2. Also, the first slit 68 extends from the inner periphery of one of the first insertion holes, that is, from the inner periphery of the first specified insertion hole 63, which is farthest from the first front end joint portion 59 of the shorter length L2. In other words, the extending length L2 of the first front end joint portion 59 close to the harness 42 is shorter than the extending length L1 of the second front end joint portion 60 far from the harness 42. Thus, even if the second slit 80 and the first slit 68, which extend from the inner peripheries of the second specified insertion hole 78 and first specified insertion hole 63, are short, the gas generator 40 and the harness 42 are unlikely to catch on the end of the second insertion port 77 when the gas generator 40 is rotated about the specified bolt 44. Also, since the extending length L1 of the second front end joint portion 60, which is far from the harness 42, is set to be long, the dimension of the first insertion port 62 (the second insertion port 77) in the automobile width direction is reduced, so that the airtightness of the airbag main body 51 is improved. This effectively restrains leakage of inflation gas.

As described above, in the airbag 50, the second insertion port 77 of the inner bag 70 and the first insertion port 62 of the airbag main body 51 function as a passage through which the gas generator 40 is inserted and also as a passage through which the harness 42 is drawn out of the airbag 50. In contrast, the second insertion port 77 and the first insertion port 62 can serve as a passage for the inflation gas from the gas generator 40.

Also, the second slit 80, which extends from the second specified insertion hole 78, and the first slit 68, which extends from the first specified insertion hole 63, can serve as a passage for the inflation gas. This because the specified bolt 44 spreads the second slit 80 and the first slit 68 in the front-rear direction.

In the present embodiment, the second flap portion 76 and the first flap portion 65 are both folded back downward and rearward and placed over the front end of the airbag main body 51, so that the second insertion port 77, the first insertion port 62, the second slit 80, and the first slit 68 are closed. Further, the second flap portion 76 is held by the second holding portion such that the second flap portion 76 is placed over the front end of the airbag main body 51. Specifically, the second specified engagement hole 81 of the second flap portion 76, which is folded back downward and rearward to be placed over the front end of the airbag main body 51, is engaged with the specified bolt 44. Also, the second general engagement holes 82 are engaged with the general bolts 45. Accordingly, the second flap portion 76 is held such that the second flap portion 76 is placed over the front end of the airbag main body 51. The second insertion port 77, the first insertion port 62, the second slit 80, and the first slit 68 are all closed.

Also, the first flap portion 65 is held by the first holding portion such that the first flap portion 65 is placed over the front end of the airbag main body 51. Specifically, the first specified engagement hole 66 of the first flap portion 65, which is folded back downward and rearward to be placed over the front end of the airbag main body 51, is engaged with the specified bolt 44. Also, the first general engagement holes 67 are engaged with the general bolts 45. Accordingly, the first flap portion 65 is held such that the first flap portion 65 is placed over the front end of the airbag main body 51. The second insertion port 77, the first insertion port 62, the second slit 80, and the first slit 68 are all closed.

The harness 42, which has been drawn out of the airbag 50 through the second insertion port 77 and the first insertion port 62, is deformed in accordance with folding of the second flap portion 76 and the first flap portion 65 since the harness 42 has flexibility. The harness 42 is unlikely to hamper the folding of the second flap portion 76 or the first flap portion 65 or impair the highly airtight state of the airbag 50.

The airbag module AM, which is configured by installing the gas generator 40 in the airbag 50, is fastened to the accommodation recess 14 of the seat pan 13 at the specified bolt 44 and the general bolts 45.

In the airbag apparatus of the present embodiment, when no impact is applied to the front bumper of the automobile due to a frontal collision, the controller 92 sends no activation signal to the gas generator 40, so that the gas generator 40 does not supply the inflation gas G to the airbag 50. Except for the front part, most of the airbag 50 continues being arranged between the seat pan 13 and the cushion portion 11 in a flatly spread state (refer to FIGS. 1 and 2).

When an impact is applied to the automobile from the front with respect to the automobile seat S, for example, due to a frontal collision, the occupant P acts to move forward due to inertia. The restraining action of the seat belt device 30 holds the occupant P on the seat portion 10. However, depending on the posture of the occupant P, the lumbar region PP may act to move forward.

Figure 13:
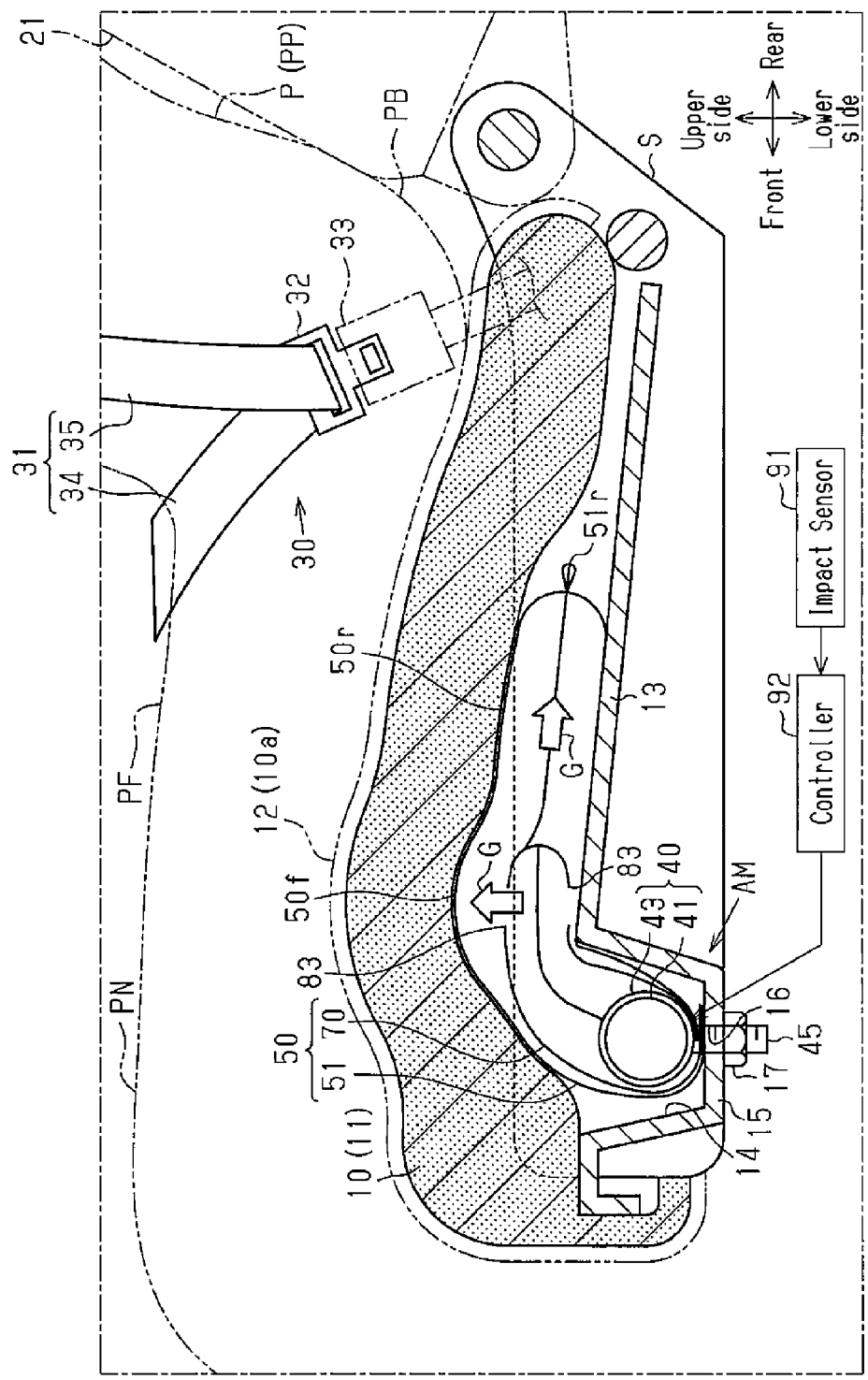
FIG. 13 is a partial cross-sectional side view illustrating a state in which the inner bag and the airbag main body are inflated from the state shown in FIG. 2, so that the seat surface of the seat portion is raised.

In contrast, when the impact sensor 91 detects that a frontal impact of a magnitude greater than or equal to a predetermined value has been applied to the front bumper, the controller 92 outputs, based on the detection signal, an activation signal for activating the inflator 41 to the inflator 41 via the harness 42. In response to the activation signal, the inflator 41 starts discharging the inflation gas G through the gas outlet 41*a* as shown in FIG. 13. The inflation gas G inflates the inner bag 70. Also, the inflation gas G is discharged through the gas vent holes 83, 84 of the inner bag 70 and inflates the airbag main body 51.

Then, as described above, the airbag 50, which is inflated between the seat pan 13 and the cushion portion 11, pushes up the cushion portion 11 so that the seat surface 10*a* of the seat portion 10 bulges. The region including the back of the lower thighs PN and the buttocks PB of the occupant P, who is restrained to the automobile seat S by the seat belt device 30, is pushed upward by the bulging seat surface 10*a*. The thus lifted occupant P, particularly, the lumbar region PP, is pressed against the lap belt portion 34 of the seat belt device 30, so that the restraining force of the lap belt portion 34 is increased. This suppresses the phenomenon in which the lumbar region PP of the occupant P moves forward on the seat portion 10.

The present embodiment as described above achieves the following advantages.

(1) The lower fabric portion 54 of the airbag main body 51 has the first slit 68, which extends from, among the first insertion holes, the first specified insertion hole 63, which is farthest from the harness 42 of the gas generator 40. The first slit 68 extends from the inner periphery of the first specified insertion hole 63 in a direction away from the adjacent first general insertion hole 64 (FIGS. 10A and 10B).

Therefore, when the specified bolt 44 is moved from the first specified insertion hole 63 to the first slit 68, the specified bolt 44 is moved away from the end of the insertion opening that is closer to the harness 42 (the first front end joint portion 59). Thus, during the rotation of the gas generator 40 about the specified bolt 44, the gas generator 40 is restrained from catching on the end of the insertion opening close to the harness 42 (the first front end joint portion 59). This facilitates installation of the gas generator 40 in the front end of the airbag main body 51, thereby facilitating the assembly of the gas generator 40.

(2) The extending length L2 of the first front end joint portion 59 from the first side edge joint portion 56 is set to be less than the extending length L1 of the second front end joint portion 60 from the second side edge joint portion 57. Among the first insertion holes, the first specified insertion hole 63 is farthest from the first front end joint portion 59, which has the relatively short extending length 12 (FIGS. 10A and 10B).

Thus, even if the first slit 68 is short, the gas generator 40 and the harness 42 are restrained from catching on the end of the insertion opening when the gas generator 40 is rotated about the specified bolt 44.

Also, since the extending length L1 of the second front end joint portion 60, which is far from the harness 42, is set to be long, the dimension of the first insertion port 62 in the automobile width direction can be reduced, so that the airtightness of the airbag main body 51 is improved. This effectively restrains leakage of the inflation gas G.

(3) The first flap portion 65 is located forward of the first insertion port 62 of the airbag main body 51. The first holding portion is further provided, which holds the first flap portion 65 such that the first flap portion 65 is placed over the front end of the airbag main body 51 to block the first insertion port 62 and the first slit 68 (FIG. 7).

Thus, the insertion opening and the first slit 68 of the airbag 50 are blocked by the first flap portion 65 to increase the airtightness of the airbag 50, thereby restraining leakage of the inflation gas G through the insertion opening and the first slit 68.

(4) The first holding portion is configured by all the bolts of the gas generator 40 (the specified bolt 44 and the two general bolts 45) and the first engagement holes, which are formed in the first flap portion 65 and engaged with the bolts (the first specified engagement hole 66 and the two first general engagement holes 67) as shown in FIG. 7.

In this manner, the bolts provided for fastening the gas generator 40 to the seat pan 13 (the specified bolt 44 and the two general bolts 45) are used to hold the first flap portion 65 such that the first flap portion 65 is placed over the front end of the airbag main body 51. Thus, no additional first holding portion having a structure other than bolts or engagement holes needs to be provided to hold the first flap portion 65. Accordingly, space for placing such an additional first holding portion is not required.

(5) The inner bag 70 is used as a part of the airbag 50. The insertion opening of the airbag 50 is configured by the first insertion port 62, which is formed in the front end of the airbag main body 51, and the second insertion port 77, which is formed in the front end of the inner bag 70 and surrounded by the first insertion port 62.

The inner bag 70 has the second insertion holes and the second slit 80. Among the second insertion holes of the inner bag 70, the second slit 80 extends from the inner periphery of the second specified insertion hole 78, which is farthest from the harness 42, and in a direction away from the adjacent second general insertion hole 79 (FIG. 7).

Thus, even though the inner bag 70 is used in the airbag 50, during the rotation of the gas generator 40 about the specified bolt 44, the gas generator 40 is restrained from catching on the end of the second insertion port 77 close to the harness 42 (the first front end joint portion 59). This facilitates installation of the gas generator 40 in the front end of the airbag 50, thereby facilitating the assembly of the gas generator 40.

(6) The second flap portion 76 is located forward of the second insertion port 77 of the inner bag 70. The second holding portion is further provided, which holds the second flap portion 76 such that the second flap portion 76 is placed over the front end of the airbag main body 51 to block at least the second insertion port 77 and the second slit 80 (FIG. 7).

Thus, the second insertion port 77 and the second slit 80 are blocked by the second flap portion 76 to increase the airtightness of the inner bag 70, thereby restraining leakage of the inflation gas G through the second insertion port 77 and the second slit 80.

(7) The second holding portion is configured by all the bolts of the gas generator 40 (the specified bolt 44 and the two general bolts 45) and the second engagement holes, which are formed in the second flap portion 76 and engaged with the bolts (the second specified engagement hole 81 and the two second general engagement holes 82) as shown in FIG. 7.

In this manner, the bolts provided for fastening the gas generator 40 to the seat pan 13 (the specified bolt 44 and the two general bolts 45) are used to hold the second flap portion 76 such that the second flap portion 76 is placed over the front end of the airbag main body 51. Thus, no additional second holding portion having a structure other than bolts or engagement holes needs to be provided to hold the second flap portion 76. Accordingly, space for placing such an additional second holding portion is not required.

The above-described embodiment may be modified as follows.

One or both of the first flap portion 65 and the second flap portion 76 may be omitted. If both of the first flap portion 65 and the second flap portion 76 are omitted, for example, after the gas generator 40 is arranged in the inner bag 70 in the airbag main body 51, the upper fabric portion 53 and the lower fabric portion 54 of the airbag main body 51 are joined together through sewing in the vicinity of the first insertion port 62. Then, the upper inner fabric portion 72 and the lower inner fabric portion 73 of the inner bag 70 are joined together through sewing in the vicinity of the second insertion port 77. Common sawing threads may be used for the sewing at these locations.

The number of the gas vent holes 83, 84 in the inner bag 70 may be one or more than two. The positions in the automobile width direction of the gas vent holes 83, 84 in the inner bag 70 may be other than the opposite ends. The gas vent holes 83, 84 may be formed in one of the upper inner fabric portion 72 and the lower inner fabric portion 73.

The airbag main body 51 and the inner bag 70 may be installed in the seat portion 10 (between the cushion portion 11 and the seat pan 13) in a folded state.

Substantially the entire airbag main body 51 may be configured to be inflated. Also, the airbag main body 51 may also partially include a non-inflation portion, which is neither supplied with the inflation gas G nor inflated.

The inner bag 70 may also be omitted as shown in FIG. 14. In this case, the airbag 50 is configured only by the airbag main body 51. Also, the first insertion port 62 of the airbag main body 51 configures the insertion opening of the airbag 50.

As long as the first slit 68 is located on the side farther from the adjacent first general insertion hole 64, the first slit 68 may extend in a direction inclined relative to the automobile width direction. In this case, the direction in which the second slit 80 extends is changed in correspondence with the direction in which the first slit 68 extends.

In the above illustrated embodiment, the airbag 50 has a rectangular shape in a plan view. However, an airbag having a different shape may be employed.

The gas generator 40 may be arranged at any position other than the front end in the airbag main body 51 as long as the gas generator 40 is arranged in the periphery in the airbag main body 51. The corresponding positions in the periphery of the airbag main body 51 include an end on the inner side and an end on the outer side. For example, when being arranged in the airbag main body 51 at the end on the inner side, the gas generator 40 is arranged in the airbag main body 51 at the end on the inner side while being put in a position to extend in the front-rear direction. Also, the first insertion port 62 extends in the front-rear direction in the airbag 50 at the end on the inner side. The specified insertion hole 63 and the general insertion holes 64 are formed at positions separated from each other in the front-rear direction at the end on the inner side of the lower fabric portion 54. If the gas generator 40 is arranged at the end on the outer side in the airbag main body 51, the same change is applied as the case in which the gas generator 40 is arranged at the end on the inner side.

Further, the corresponding positions include the rear end in the periphery of the airbag main body 51. In this case, as the case above, the gas generator 40 is arranged at the rear end in the airbag body 51 while being put in a position to extend in the automobile width direction. Also, the first insertion port 62 extends in the automobile width direction at the rear end in the airbag 50. The specified insertion hole 63 and the general insertion holes 64 are formed at positions separated from each other in the automobile width direction at the rear end of the lower fabric portion 54.

The above described configuration may be applied to an airbag apparatus in which the extending length L1 of the second front end joint portion 60 from the second side edge joint portion 57 and the extending length L2 of the first front end joint portion 59 from the first side edge joint portion 56 are equal to each other.

The present invention may be used to restrain any object-to-be-restrained other than the occupant P. For example, the present invention may be used to restrain a piece of baggage. In a case where a piece of baggage is placed as an object-to-be-restrained on the seat portion 10, the same advantages as the above embodiments are achieved.

The above described airbag apparatus may be applied to an automobile seat S that is arranged in an automobile such that an occupant P seated thereon faces in a direction different from the front-rear direction, for example, in a direction perpendicular to the front-rear direction (the automobile width direction). The above described airbag apparatus may be employed in any of automobile seats S that are arranged in rows in the front-rear direction.

The above described airbag apparatus may be employed in an automobile seat that has, as the support portion, a wireframe forming a part of the seat frame instead of the seat pan 13.

Automobiles in which the above described airbag apparatus can be employed include various industrial vehicles in addition to private cars.

The present invention may be applied not only to the airbag apparatus installed in an automobile seat, but also to airbag apparatuses installed in seats of other vehicles such as aircrafts and ships.

The invention claimed is:

1. A seat cushion airbag apparatus at least comprising:
an airbag, which is arranged in a seat portion of a vehicle seat, wherein an outer shape of the airbag is formed by an airbag main body; and
an elongated gas generator, which is arranged in a periphery in the airbag main body, wherein
the gas generator has an end to which a harness is connected,
the seat cushion airbag apparatus is configured to inflate the airbag main body with inflation gas supplied by the gas generator to raise a seating face of the seat portion, thereby restraining an object-to-be-restrained on the seat portion from moving forward,
the airbag includes an insertion opening, which extends along a periphery of the airbag and has a dimension shorter than a length of the gas generator,
the harness is drawn out of the airbag main body through the insertion opening,
the airbag main body includes a lower fabric portion, which configures a lower part of the airbag main body,
the lower fabric portion includes
a plurality of first insertion holes located in a periphery of the lower fabric portion, wherein, among the first insertion holes, one that is farthest from the harness is a first specified insertion hole, and
a first slit, which extends from an inner periphery of the first specified insertion hole in a direction away from the adjacent first insertion hole,
the gas generator includes a plurality of bolts, which extends downward from a plurality of positions spaced apart in a longitudinal direction of the gas generator,
the first insertion holes of the lower fabric portion are arranged to correspond to the bolts, and
the bolts are configured such that each bolt is inserted into the corresponding one of the first insertion holes of the lower fabric portion and fastened to the seat portion.

2. The seat cushion airbag apparatus according to claim 1, wherein
the periphery in the airbag main body includes a front end in the airbag main body,
the gas generator is arranged at the front end in the airbag main body and in a position to extend in a width direction of the vehicle seat,
the insertion opening extends in the width direction of the vehicle seat at a front end of the airbag, and
the first insertion holes are formed at a front end of the lower fabric portion.

3. The seat cushion airbag apparatus according to claim 2, wherein
the airbag main body further includes
an upper fabric portion, which configures an upper part of the airbag main body, and
a peripheral joint portion, which joins the periphery of the lower fabric portion and a periphery of the upper fabric portion to each other,
the peripheral joint portion includes first and second side edge joint portions, which are spaced apart from each other in the width direction of the vehicle seat and extend in a front-rear direction, and first and second front end joint portions,
the first front end joint portion extends from a front end of the first side edge joint portion toward the second side edge joint portion on the opposite side,
the second front end joint portion extends from a front end of the second side edge joint portion toward the first side edge joint portion on the opposite side,
an extending length of the first front end joint portion from the first side edge joint portion is set to be less than an extending length of the second front end joint portion from the second side edge joint portion,
at least a part of the insertion opening is configured by a first insertion port, which is located between the lower fabric portion and the upper fabric portion and between the first front end joint portion and the second front end joint portion, and
the first specified insertion hole is one of the first insertion holes that is farthest from the first front end joint portion, the extending length of which is relatively short.

4. The seat cushion airbag apparatus according to claim 2, wherein
the airbag main body includes a first insertion port formed in the front end of the airbag main body,
at least a part of the insertion opening is configured by the first insertion port of the airbag main body, and
the airbag further includes:
a first flap portion, which is formed at a position forward of the first insertion port of the airbag main body, and
a first holding portion, which holds the first flap portion such that the first flap portion is placed over the front end of the airbag main body to block the first insertion port and the first slit.

5. The seat cushion airbag apparatus according to claim 4, wherein the first holding portion includes
all the bolts of the gas generator, and
a plurality of first engagement holes, which is provided in the first flap portion and engaged with the bolts.

6. The seat cushion airbag apparatus according to claim 2, wherein
the airbag includes an inner bag, which is arranged in the airbag main body to encompass the gas generator and configures a part of the airbag,
the inner bag includes a gas venting portion, which vents the inflation gas from the gas generator into the airbag main body,
the airbag main body includes a first insertion port formed in the front end of the airbag main body,
the inner bag includes
a second insertion port formed in a front end of the inner bag, wherein the second insertion port is surrounded by the first insertion port,
a plurality of second insertion holes, into which the bolts are inserted, wherein, among the second insertion holes, one that is farthest from the harness is a second specified insertion hole, and
a second slit, which extends from an inner periphery of the second specified insertion hole in a direction away from the adjacent second insertion hole, and
the insertion opening is configured by the first insertion port of the airbag main body and the second insertion port of the inner bag.

7. The seat cushion airbag apparatus according to claim 6, wherein the airbag further includes a second flap portion, which is formed at a position forward of the second insertion port of the inner bag, and a second holding portion, which holds the second flap portion such that the second flap portion is placed over the front end of the airbag main body to block at least the second insertion port and the second slit.

8. The seat cushion airbag apparatus according to claim 7, wherein the second holding portion includes all the bolts of the gas generator, and a plurality of second engagement holes, which is provided in the second flap portion and engaged with the bolts.

* * * * *